(12) United States Patent
Lanman et al.

(10) Patent No.: US 10,866,418 B2
(45) Date of Patent: Dec. 15, 2020

(54) FOCUS ADJUSTING MULTIPLANAR HEAD MOUNTED DISPLAY

(71) Applicant: Facebook Technologies, LLC, Menlo Park, CA (US)

(72) Inventors: Douglas Robert Lanman, Bellevue, WA (US); William Aaron Nicholls, Seattle, WA (US); Marina Zannoli, Seattle, WA (US); Kevin James MacKenzie, Sammamish, WA (US); James Hillis, Redmond, WA (US); Yusufu Njoni Bamaxam Sulai, Bothell, WA (US); Olivier Mercier, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/900,739

(22) Filed: Feb. 20, 2018

(65) Prior Publication Data

US 2018/0239145 A1    Aug. 23, 2018

Related U.S. Application Data

(60) Provisional application No. 62/461,451, filed on Feb. 21, 2017.

(51) Int. Cl.
*G02B 27/01* (2006.01)
*G06F 3/01* (2006.01)
*G02B 7/04* (2006.01)

(52) U.S. Cl.
CPC ......... *G02B 27/0172* (2013.01); *G06F 3/013* (2013.01); *G02B 7/04* (2013.01);
(Continued)

(58) Field of Classification Search
CPC ............... G02B 27/0172; G02B 7/04; G02B 2027/0138; G02B 2027/014; G02B 2027/0185; G02B 2027/0187; G06F 3/013
See application file for complete search history.

(56) References Cited

U.S. PATENT DOCUMENTS 9,921,413 B2    3/2018  Xu
2006/0210111 A1  9/2006  Cleveland et al.
(Continued)

FOREIGN PATENT DOCUMENTS

JP    2014-219621 A     11/2014
WO   WO2016/105521    *  6/2016
WO   WO 2016/105521 A1   6/2016

OTHER PUBLICATIONS

PCT International Search Report and Written Opinion, PCT Application No. PCT/US2018/018860, dated Jun. 11, 2018, 16 pages.
(Continued)

*Primary Examiner* — Lisa S Landis
(74) *Attorney, Agent, or Firm* — Fenwick & West LLP (57) ABSTRACT

A multiplanar head mounted display (HMD) includes two or more artificial display planes for each eye located at optical distances that can be dynamically adjusted based on a location within a scene presented by the HMD that the user views. For example, a scene is presented on two or more electronic display elements (e.g., screens) of the HMD. A focal length of an optics block that directs image light from the electronic display elements towards the eyes of a user is adjusted using a varifocal system (e.g., an element that mechanically changes a distance between a lens system in the optics block and the electronic display element, an element that changes shape of one or more lenses in the lens
(Continued)

system in the optics block, etc.) based on a location or object within the scene where the user is looking.

12 Claims, 7 Drawing Sheets

(52) U.S. Cl.
CPC ............... *G02B 2027/014* (2013.01); *G02B 2027/0138* (2013.01); *G02B 2027/0185* (2013.01); *G02B 2027/0187* (2013.01)

(56) References Cited

U.S. PATENT DOCUMENTS

| | | |
|---|---|---|
| 2009/0295683 A1* | 12/2009 | Pugh .................. G02B 27/0101 345/9 |
| 2011/0075257 A1 | 3/2011 | Hua et al. |
| 2013/0241805 A1 | 9/2013 | Gomez |
| 2014/0361987 A1 | 12/2014 | Bickerstaff et al. |
| 2018/0048882 A1* | 2/2018 | Eash .................... H04N 13/337 |

OTHER PUBLICATIONS

Extended European Search Report, European Application No. 18756697.1, dated Feb. 28, 2020, 7 pages.

* cited by examiner

(Real World)

FIG. 7A (3D Display)

FIG. 7B (Frame n)
FIG. 8A (Frame n+1)
FIG. 8B

FOCUS ADJUSTING MULTIPLANAR HEAD MOUNTED DISPLAY

CROSS-REFERENCE TO RELATED APPLICATIONS

This application claims the benefit of U.S. Application No. 62/461,451, filed Feb. 21, 2017 which is incorporated by reference in their entirety.

BACKGROUND

The present disclosure generally relates to enhancing images from electronic displays, and specifically to a multiplanar display having two or more display planes located at different optical distances that can be dynamically adjusted based on a location within a scene presented by a head mounted display.

A head mounted display can be used to simulate artificial or virtual environments. For example, stereoscopic images can be displayed on an electronic display inside the headset to simulate the illusion of depth and head tracking sensors can be used to estimate what portion of the artificial environment is being viewed by the user. Such a simulation, however, can cause visual fatigue and nausea resulting from an inability of existing headsets to correctly render or otherwise compensate for vergence and accommodation conflicts.

SUMMARY

A multiplanar head mounted display (HMD) includes two or more virtual display planes for each eye located at optical distances that can be dynamically adjusted based on a location within a scene presented by the HMD that the user views. For example, a scene is presented on two or more electronic display elements (e.g., screens) of the HMD. A focal length of an optics block that directs image light from the electronic display elements towards the eyes of a user is adjusted using a varifocal system (e.g., an element that mechanically changes a distance between a lens system in the optics block and the electronic display element, an element that changes shape of one or more lenses in the lens system in the optics block, etc.) based on a location or object within the scene where the user is looking.

A head mounted display (HMD), in one embodiment, includes a first electronic display located at first optical distance from an optics block of the HMD and a second electronic display (for each eye of the user) located at a second optical distance from the optics block. Each electronic display is configured to display a different virtual plane of the virtual scene to the user wearing the HMD. Objects in the virtual scene, in one embodiment, are mapped to scene geometry or depth information provided by a content creator and each electronic display is mapped to a different subset of the objects based on their scene geometry. For example, a first electronic display displaying a first virtual display plane located at a first optical distance displays objects within the virtual scene that are mapped to scene geometry at or near a first virtual display plane at the first optical distance. Accordingly, each subsequent electronic display displays different objects based on the location of the virtual display plane and the scene geometry. Accordingly, the virtual scene content from each of the virtual display planes is combined for viewing by the viewing user. Thus, at least one of the electronic displays is at least semi-transparent to allow image light of the virtual scene to be combined for viewing by the user wearing the HMD.

A head mounted display (HMD), in an alternative embodiment, includes a single electronic display (for each eye of the user) that that sequentially displays each of the virtual display planes. As above, objects in the virtual scene are mapped to scene geometry of the virtual scene and each of the two or more virtual planes display a different subset of the objects based on the scene geometry, but sequentially instead of simultaneously as described previously.

Moreover, the HMD automatically adjusts its focus based on a location within a virtual scene presented by the virtual reality headset that the user views. The virtual scene is presented on the one or more electronic displays and a focal length of an optics block that directs image light from the electronic displays to the eyes of the user is adjusted using a varifocal element (e.g., an element that mechanically changes a distance between a lens system in the optics block and the electronic display element, an element that changes shape of one or more lenses in the lens system in the optics block, etc.) based on a location or object within the virtual scene where the user is looking. For example, the HMD tracks a user's eyes to approximate gaze lines and determines a gaze point including a vergence depth as an estimated point of intersection of the gaze lines. The gaze point identifying an object or plane of focus for a particular frame of the virtual scene presented to the user by the HMD.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Overview

A multiplanar head mounted display (HMD) includes two or more artificial display planes for each eye located at optical distances that can be dynamically adjusted based on a location within a scene presented by the HMD that the user views. For example, a scene is presented on two or more electronic display elements (e.g., screens) of the HMD. A focal length of an optics block that directs image light from the electronic display elements towards the eyes of a user is adjusted using a varifocal system (e.g., an element that mechanically changes a distance between a lens system in the optics block and the electronic display element, an element that changes shape of one or more lenses in the lens system in the optics block, etc.) based on a location or object within the scene where the user is looking.

Figure 1:
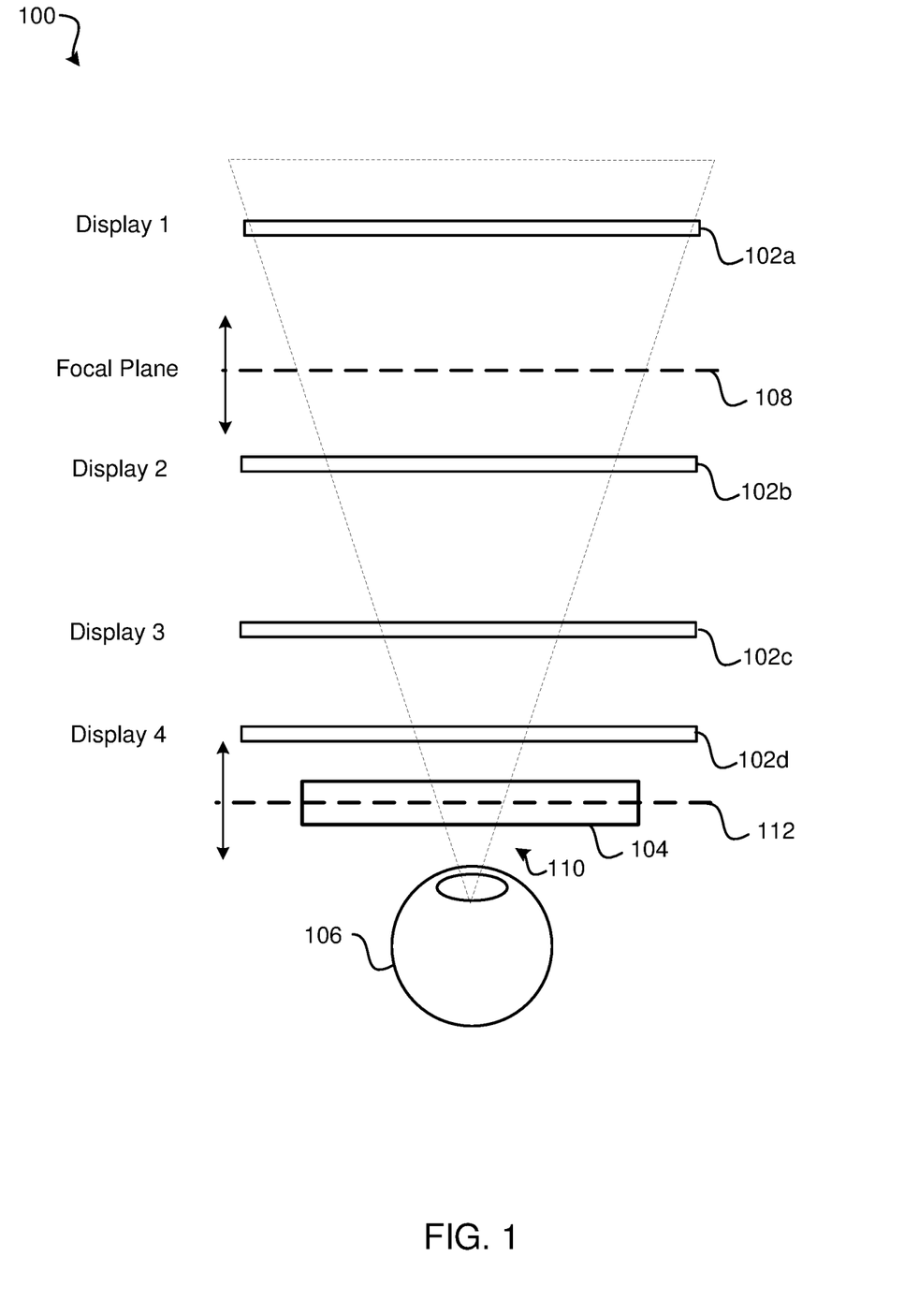
FIG. 1 shows an example multiplanar display where the location of a focal plane can be adjusted by a varifocal system, in accordance with one embodiment.

FIG. 1 shows example multiplanar display system 100 that comprises four separate electronic displays 102a, 102b, 102c, and 102d (collectively referred to as "electronic displays 102") located at different distances relative to optics block 104 and exit pupil 110 of multiplanar display system 100. Each electronic display 102, in one embodiment, displays a different depth component or focal plane of a scene (e.g., a virtual reality scene) that together present the user with a complete image of the scene. The different electronic displays 102 may have dissimilar resolutions, refresh rates, number of color channels, brightness capabilities, or some combination thereof.

Electronic displays 102 produce multiple image planes. For example, each image of an artificial scene may include z-values corresponding to distance values for each pixel currently displayed. While one pixel is illuminated, the visually aligned pixels of the other electronic displays 102 remain transparent.

Optics block 104 presents content from one or more electronic displays 102 at specific focal planes based in part on their position relative to the optics block. Thus, the position of each electronic display 102 relative to optics block 104 has a corresponding focal plane 108. A varifocal system can change the location of focal plane 108, such as by changing position 512 of optics block 104 relative to electronic displays 102 or other property, based on a location within the scene corresponding to where the user is looking. Instead of mechanically moving optics block 104 to change the location of focal plane 108, as shown in FIG. 1, properties of optics block 104 affecting the focal length could be varied to change to location of focal plane 108 or the positions of one or more of electronic displays 102 could change relative to each other and/or exit pupil 110.

To determine the location or object within the scene where the user is looking, multiplanar display system 100 of an HMD includes an eye tracking system configured to detect vergence and/or accommodation and other viewing parameters (e.g., position, orientation, and pupil size). Thus, multiplanar display system 100 tracks a user's eyes and approximates a gaze point and vergence depth based on the detected vergence and other viewing parameters and the varifocal system adjusts the power of the optics block to provide accommodation for the eyes of the user at the vergence depth.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Plane Sequential Varifocal Multiplanar Display

Figure 2:
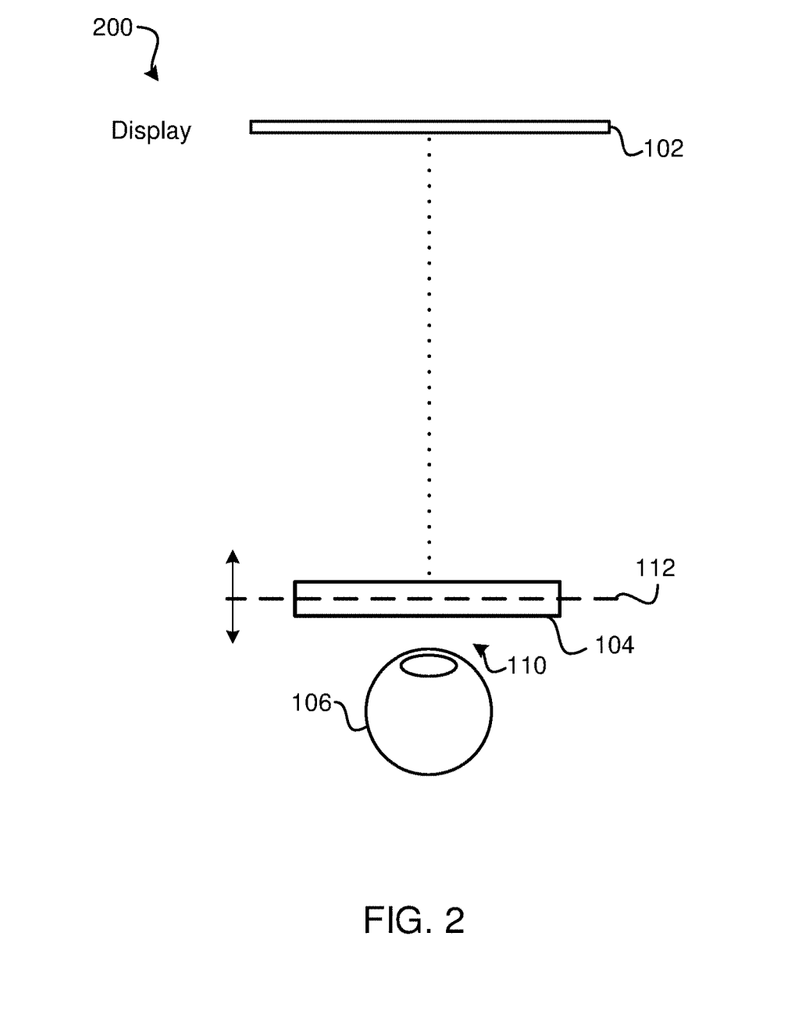
FIG. 2 shows an example plane sequential varifocal multiplanar display, in accordance with one embodiment.

FIG. 2 shows example multiplanar display system 200 that, in one embodiment, comprises a single electronic display 102 located a distance from optics block 104, an eye tracking system configured to detect vergence and/or accommodation and other viewing parameters (e.g., position, orientation, and pupil size), and a varifocal system adjusts the focus of optics block 104 to a location corresponding to the detected vergence. When illuminated, light emitted from single electronic display 102 is presented at a particular focal depth as an artificial display plane. The location of the artificial focal plane is based in part on a focal setting of the optics block 104 that is set by the varifocal system. Electronic display 102 may display multiple artificial display planes by illuminating (e.g., emitting image light) electronic display 102 multiple times while changing the fixed focus of optics block 104 using the varifocal system. Thus, electronic display 102, in one embodiment, is a high-refresh-rate display (e.g., 90 Hz times the number of display planes). The varifocal element may then oscillate in a fixed focus pattern (e.g., sinusoidal oscillation from 0 to 3 diopters) and electronic display 102 refresh can be timed to create artificial display planes at arbitrary optical depths. The optical depth of the artificial display planes are then adjusted based on vergence, position, orientation, pupil size, and other measurements received from the eye tracking system.

At least one artificial display plane is rendered at a plane close to an estimated accommodation plane of the viewer based on a viewing location of the user within the artificial scene. The images of the artificial scene are, thus, displayed with each artificial display plane as a layer to maximize a visual quality metric using a multiplane decomposition algorithm. Further, the artificial planes at which objects in the artificial scene are displayed can be based on scene geometry, depth information provided by a content creator, or on information from the eye tracking system.

Plane Simultaneous Varifocal Multiplanar Displays

Figure 3:
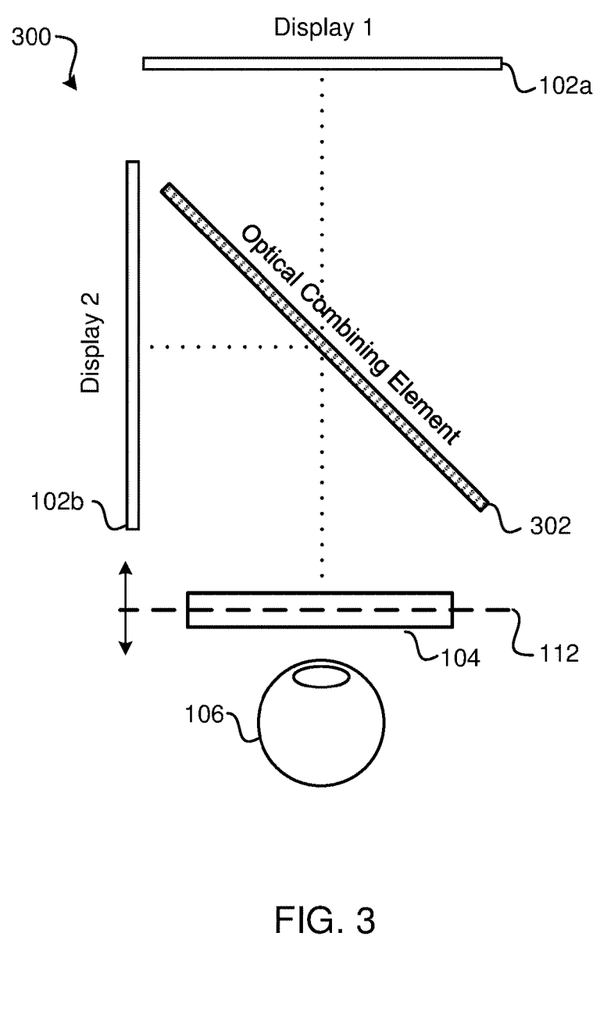
FIG. 3 shows an example plane simultaneous varifocal multiplanar display that includes a beam splitter to direct light from two perpendicularly opposed electronic displays, in accordance with one embodiment.

FIG. 3 shows example multiplanar display system 300 that, in one embodiment, comprises two electronic displays 102a and 102b, optical combining element 302, such as a beam splitter, and an eye tracking system and a varifocal system, as similarly described above. In this example, electronic displays 102a and 102b are positioned perpendicular relative to each other and optical combining element 302 is orientated at an angle relative to both electronic displays 102a and 102b to combine images of the two displays. The two electronic displays 102a and 102b can produce multiple artificial display planes within a scene and the optical depth of each of electronic displays 102a and 102b can be adjusted by the varifocal system. For example, electronic display 102a may display portions of the scene image located in an artificial plane closer to the user relative to portions of the scene image displayed by electronic display 102b.

Plane Simultaneous Varifocal Multiplanar Displays

Figure 4:
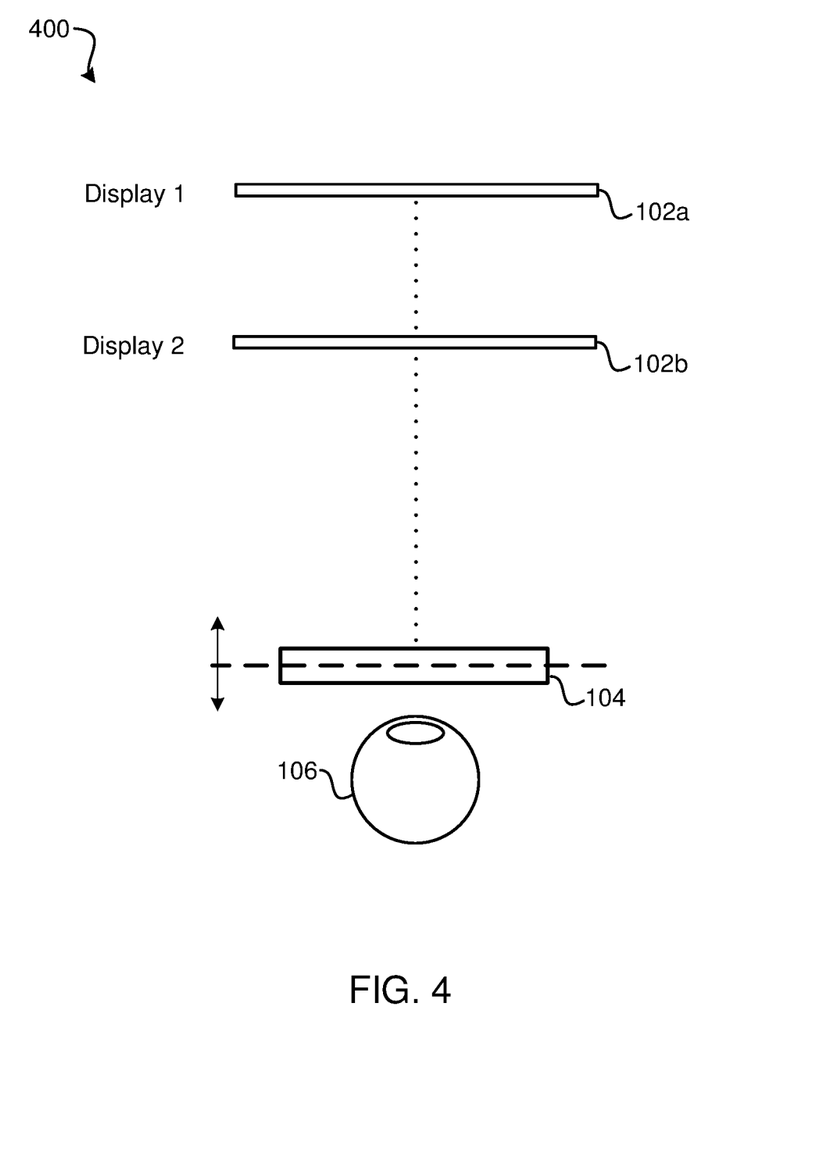
FIG. 4 shows an example plane simultaneous varifocal multiplanar display with two electronic displays in optical series, in accordance with one embodiment.

FIG. 4 shows example multiplanar display system 400 that, in one embodiment, comprises two electronic displays 102a and 102b and an eye tracking system and a varifocal system, as similarly described above. The two electronic displays 102a and 102b are, in this example, positioned in optical series at different distances relative to optics block 104 and, thus, may be semi-transparent (e.g., a stack of TOLEDs or LCDs). Additionally, electronic displays 102a and 102b may not only emit light, but may also absorb it (e.g., LCDs).

Electronic displays 102a and 102b, in one embodiment, may each display a set of different artificial planes of the scene that together present the user with a complete image of the scene. The different set of artificial planes may also correspond to artificial planes that do not need to be rendered in the highest resolution and, thus, electronic displays 102a and 102b may each have dissimilar resolutions, refresh rates, number of color channels, brightness capabilities, and so forth. Accordingly, multiple artificial display planes or layers of the scene are produced by two electronic displays 102a and 102b and the optical depth of each display is adjusted, as above, using the varifocal system to keep eye 106 of the user in accommodation as the user's vergence depth, as detected by the eye tracking system.

Multi-Planar Varifocal System

Figure 5:
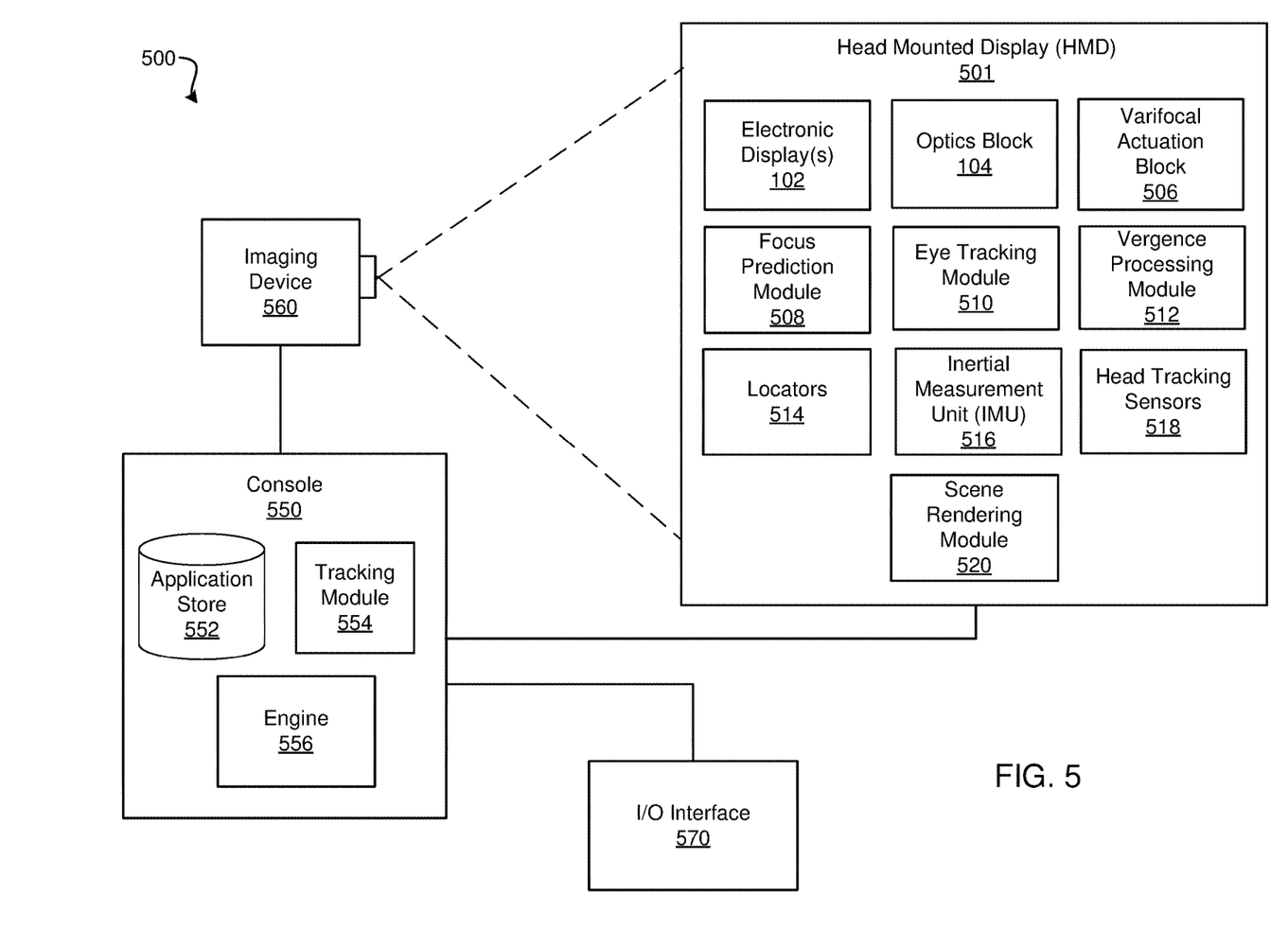
FIG. 5 shows an example varifocal system, in accordance with one embodiment.

FIG. 5 shows multi-planar varifocal system 500 in which a head-mounted display (HMD) 501 operates. Varifocal system 500 may be for use as a virtual reality (VR) system, an augmented reality (AR) system, a mixed reality (MR) system, or some combination thereof. In this example, varifocal system 500 includes HMD 501, imaging device 560, and I/O interface 570, which are each coupled to console 550. While FIG. 1 shows a single HMD 501, a single imaging device 560, and a single I/O interface 570, in other embodiments, any number of these components may be included in the system. For example, there may be multiple HMDs 501 each having an associated I/O interface 570 and being monitored by one or more imaging devices 560, with each HMD 501, I/O interface 570, and imaging devices 560 communicating with the console 550. In alternative configurations, different and/or additional components may also be included in the system environment.

HMD 501 presents content to a user. Example content includes images, video, audio, or some combination thereof. Audio content may be presented via a separate device (e.g., speakers and/or headphones) external to HMD 501 that receives audio information from HMD 501, console 550, or both. HMD 501 includes electronic display(s) 102, optics block 104, varifocal actuation block 506, focus prediction module 508, eye tracking module 510, vergence processing module 512, one or more locators 514, internal measurement unit (IMU) 516, head tracking sensors 518, and scene rendering module 520.

Optics block 104 directs light from electronic display(s) 102 to an exit pupil for viewing by a user using one or more optical elements, such as apertures, Fresnel lenses, convex lenses, concave lenses, filters, and so forth, and may include combinations of different optical elements. In some embodiments, one or more optical elements in optics block 104 may have one or more coatings, such as anti-reflective coatings. Magnification of the image light by optics block 104 allows electronic display(s) 102 to be physically smaller, weigh less, and consume less power than larger displays. Additionally, magnification of the image light may increase a field of view of the displayed content. For example, the field of view of the displayed content is such that the displayed content is presented using almost all (e.g., 550 degrees diagonal), and in some cases all, of the user's field of view.

Optics block 104 may be designed to correct one or more optical errors. Examples of optical errors include: barrel distortion, pincushion distortion, longitudinal chromatic aberration, transverse chromatic aberration, spherical aberration, comatic aberration, field curvature, astigmatism, and so forth. In some embodiments, content provided to electronic display(s) 102 for display is pre-distorted, and optics block 104 corrects the distortion when it receives image light from electronic display(s) 102 generated based on the content.

Varifocal actuation block 506 includes a varifocal element that causes optics block 104 to vary the focal length (or optical power) of HMD 501 in order to keep a user's eyes in a zone of comfort as vergence and accommodation change. In one embodiment, varifocal actuation block 506 physically changes the distance between electronic display(s) 102 and optical block 104 by moving electronic display(s) 102 or optical block 104 (or both). Alternatively, varifocal actuation block 506 changes the focal length of optics block 104 by adjusting one or more properties of one or more lenses. Example properties of a lens adjusted by the varifocal actuation block include: an optical path length, an index of refraction of a lens medium, a shape of a lens, and so forth. For example, varifocal actuation block 506 changes the focal length of the one or more lenses using shape-changing polymer lenses, electrowetting methods with liquid lenses, Alvarez-Lohmann lenses, deformable membrane mirrors, liquid crystal (electroactive) lenses, or phase-only spatial light modulators (SLMs), or any other suitable component. Additionally, moving or translating two or more lenses relative to each other may also be used to change the focal length of HMD 501. Thus, varifocal actuation block 506 may include actuators or motors that move one or more of electronic display(s) 102 and/or optical block 104 on a track to change the distance between them or may include actuators and other components or mechanisms for changing the properties of one or more lenses included in optics block 104. Varifocal actuation block 506 may be separate from or integrated into optics block 104 in various embodiments.

Each state of optics block 104 corresponds to a focal length of HMD 501 or to a combination of the focal length and eye position relative to optics block 104 (as discussed further below). In operation, optics block 104 may move in a range of ~5 mm with a positional accuracy of ~5 µm for a granularity of around 1000 focal lengths, corresponding to 1000 states of optics block 104. Any number of states could be provided; however, a limited number of states accommodate the sensitivity of the human eye, allowing some embodiments to include fewer focal lengths. For example, a first state could correspond to a focal length of a theoretical infinity meters (0 diopter), a second state could correspond to a focal length of 2.0 meters (0.5 diopter), a third state could correspond to a focal length of 1.0 meters (1 diopter), a fourth state could correspond to a focal length of 0.5 meters (1 diopter), a fifth state could correspond to a focal length of 0.333 meters (3 diopter), and a sixth state could correspond to a focal length of 0.250 meters (4 diopter). Varifocal actuation block 506, thus, sets and changes the state of optics block 104 to achieve a desired focal length.

Focus prediction module 508 is an encoder including logic that tracks the state of optics block 104 to predict to one or more future states or locations of optics block 104. For example, focus prediction module 508 accumulates historical information corresponding to previous states of optics block 104 and predicts a future state of optics block 104 based on the previous states. Because rendering of a virtual scene by HMD 501 is adjusted based on the state of optics block 104, the predicted state allows scene rendering module 520, further described below, to determine an adjustment to apply to the virtual scene for a particular frame. Accordingly, focus prediction module 508 communicates information describing a predicted state of optics block 104 for a frame to scene rendering module 520. Adjustments for the different states of optics block 104 performed by scene rendering module 520 are further described below.

Eye tracking module 510 tracks an eye position and eye movement of a user of HMD 501. In one embodiment, a camera or other optical sensor inside HMD 501 captures image information of a user's eyes, and eye tracking module 110 uses the captured information to determine interpupillary distance, interocular distance, a three-dimensional (3D) position of each eye relative to HMD 501 (e.g., for distortion adjustment purposes), including a magnitude of torsion and rotation (i.e., roll, pitch, and yaw) and gaze directions for each eye. In one example, infrared light is emitted within HMD 501 and reflected from each eye. The reflected light is received or detected by the camera and analyzed to extract eye rotation from changes in the infrared light reflected by each eye. Many methods for tracking the eyes of a user can be used by eye tracking module 510. Accordingly, eye tracking module 510 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, eye tracking module 510 integrates information from past measurements, measurements identifying a position of a user's head, and 3D information describing a scene presented by electronic display element 102. Thus, information for the position and orientation of the user's eyes is used to determine the gaze point in a virtual scene presented by HMD 501 where the user is looking.

Further, 3D location of a pupil relative to optics block 104 changes as the eye moves to look in different directions. The varying 3D location of the pupil relative to optics block 104 as viewing direction changes contributes to distortion perceived by the user as "pupil swim." Accordingly, measuring distortion at different 3D eye positions relative to optics block 104 and generating distortion corrections for different positions and distances allows mitigation of distortion caused by "pupil swim" by tracking the 3D position of a user's eyes and applying a distortion correction corresponding to the 3D position of each of the user's eye at a given point in time. Thus, knowing the 3D position of each of a user's eyes allows for the mitigation of distortion caused by changes in the distance between the pupil of the eye and optics block 104 by applying a distortion correction for each 3D eye position. Methods for reducing pupil swim are further described in U.S. Provisional Patent Application No. 62/302,675, filed on Mar. 2, 2016 which is hereby incorporated by reference in its entirety.

In addition to contributing to distortion perceived by the user as "pupil swim," the varying 3D location of the pupil can cause the user to perceive parallax in a multiplanar display system. For example, the varying 3D location of the pupil within the eyebox relative to electronic displays displaying images at different depths relative to the eyebox can cause problems in how the final image (or composite image) appears to the user. Accordingly, by tracking the 3D location of each of a user's eyes, a parallax correction can be rendered into one or more frames of the content displayed by the multiple electronic displays based on a current location of the user's 3D eye position to account for parallax.

Vergence processing module 512 determines a vergence depth of a user's gaze based on the gaze point or an estimated intersection of the gaze lines determined by eye tracking module 510. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, vergence processing module 512 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused and a depth from the user's eyes at which the eyes are focused, thereby, providing information, such as an object or plane of focus, for rendering adjustments to the virtual scene.

In some embodiments, rather than provide accommodation for the eye at a determined vergence depth, accommodation may be directly determined by a wavefront sensor, such as a Shack-Hartmann wavefront sensor; hence, a state of optics block 104 may be a function of the vergence or accommodation depth and the 3D position of each eye, so optics block 104 brings objects in a scene presented by electronic display element 102 into focus for a user viewing the scene. Further, vergence and accommodation information may be combined to focus optics block 104 and to render synthetic depth of field blur.

Locators 514 are objects located in specific positions on HMD 501 relative to one another and relative to a specific reference point on HMD 501. Locator 514 may be a light emitting diode (LED), a corner cube reflector, a reflective marker, a type of light source that contrasts with an environment in which HMD 501 operates, or some combination thereof. Active locators 514 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

Locators 514 can be located beneath an outer surface of HMD 501, which is transparent to the wavelengths of light emitted or reflected by locators 514 or is thin enough not to substantially attenuate the wavelengths of light emitted or reflected by locators 514. Further, the outer surface or other portions of HMD 501 can be opaque in the visible band of wavelengths of light. Thus, locators 514 may emit light in the IR band while under an outer surface of HMD 501 that is transparent in the IR band but opaque in the visible band.

IMU 516 is an electronic device that generates fast calibration data based on measurement signals received from one or more of head tracking sensors 518, which generate one or more measurement signals in response to motion of HMD 501. Examples of head tracking sensors 518 include accelerometers, gyroscopes, magnetometers, other sensors suitable for detecting motion, correcting error associated with IMU 516, or some combination thereof. Head tracking sensors 518 may be located external to IMU 516, internal to IMU 516, or some combination thereof.

Based on the measurement signals from head tracking sensors 518, IMU 516 generates fast calibration data indicating an estimated position of HMD 501 relative to an initial position of HMD 501. For example, head tracking sensors 518 include multiple accelerometers to measure translational motion (forward/back, up/down, left/right) and multiple gyroscopes to measure rotational motion (e.g., pitch, yaw, and roll). IMU 516 can, for example, rapidly sample the measurement signals and calculate the estimated position of HMD 501 from the sampled data. For example, IMU 516 integrates measurement signals received from the accelerometers over time to estimate a velocity vector and integrates the velocity vector over time to determine an estimated position of a reference point on HMD 501. The reference point is a point that may be used to describe the position of HMD 501. While the reference point may generally be defined as a point in space, in various embodiments, reference point is defined as a point within HMD 501 (e.g., a center of the IMU 130). Alternatively, IMU 516 provides the sampled measurement signals to console 550, which determines the fast calibration data.

IMU 516 can additionally receive one or more calibration parameters from console 550. As further discussed below, the one or more calibration parameters are used to maintain tracking of HMD 501. Based on a received calibration parameter, IMU 516 may adjust one or more IMU parameters (e.g., sample rate). In some embodiments, certain calibration parameters cause IMU 516 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

Scene render module 520 receives content for the virtual scene from engine 556 and provides the content for display on electronic display(s) 102. Additionally, scene render module 520 can adjust the content based on information from focus prediction module 108, vergence processing module 512, IMU 516, and head tracking sensors 518. For example, upon receiving the content from engine 556, scene render module 520 adjusts the content based on the predicted state (i.e., eye position and focal length) of optics block 104 received from focus prediction module 508 by adding a correction or pre-distortion into rendering of the virtual scene to compensate or correct for the distortion caused by the predicted state of optics block 104. Scene render module 520 may also add depth of field blur based on the user's gaze, vergence depth (or accommodation depth) received from vergence processing module 512, or measured properties of the user's eye (e.g., 3D position of the eye, etc.). Additionally, scene render module 520 determines a portion of the content to be displayed on electronic display(s) 102 based on one or more of tracking module 554, head tracking sensors 518, or IMU 516, as described further below.

Imaging device 560 generates slow calibration data in accordance with calibration parameters received from console 550. Slow calibration data includes one or more images showing observed positions of locators 514 that are detectable by imaging device 560. Imaging device 560 may include one or more cameras, one or more video cameras, other devices capable of capturing images including one or more locators 514, or some combination thereof. Additionally, imaging device 560 may include one or more filters (e.g., for increasing signal to noise ratio). Imaging device 560 is configured to detect light emitted or reflected from locators 514 in a field of view of imaging device 560. In embodiments where locators 514 include passive elements (e.g., a retroreflector), imaging device 560 may include a light source that illuminates some or all of locators 514, which retro-reflect the light towards the light source in imaging device 560. Slow calibration data is communicated from imaging device 560 to console 550, and imaging device 560 receives one or more calibration parameters from console 550 to adjust one or more imaging parameters (e.g., focal length, focus, frame rate, ISO, sensor temperature, shutter speed, aperture, etc.).

I/O interface 570 is a device that allows a user to send action requests to console 550. An action request is a request to perform a particular action. For example, an action request may be to start or end an application or to perform a particular action within the application. I/O interface 570 may include one or more input devices. Example input devices include a keyboard, a mouse, a game controller, or any other suitable device for receiving action requests and communicating the received action requests to console 550. An action request received by I/O interface 570 is communicated to console 550, which performs an action corresponding to the action request. In some embodiments, I/O interface 570 may provide haptic feedback to the user in accordance with instructions received from console 550. For example, haptic feedback is provided by the I/O interface 570 when an action request is received, or console 550 communicates instructions to I/O interface 570 causing I/O interface 570 to generate haptic feedback when console 550 performs an action.

Console 550 provides content to HMD 501 for presentation to the user in accordance with information received from imaging device 560, HMD 501, or I/O interface 570. In the example shown in FIG. 1, console 550 includes application store 552, tracking module 554, and virtual reality (VR) engine 556. Some embodiments of console 550 have different or additional modules than those described in conjunction with FIG. 1. Similarly, the functions further described below may be distributed among components of console 550 in a different manner than is described here.

Application store 552 stores one or more applications for execution by console 550. An application is a group of instructions, that when executed by a processor, generates content for presentation to the user. Content generated by an application may be in response to inputs received from the user via movement of HMD 501 or interface device 570. Examples of applications include gaming applications, conferencing applications, video playback application, or other suitable applications.

Tracking module 554 calibrates the system using one or more calibration parameters and may adjust one or more calibration parameters to reduce error in determining position of HMD 501. For example, tracking module 554 adjusts the focus of imaging device 560 to obtain a more accurate position for observed locators 514 on HMD 501. Moreover, calibration performed by tracking module 554 also accounts for information received from IMU 516. Additionally, if tracking of HMD 501 is lost (e.g., imaging device 560 loses line of sight of at least a threshold number of locators 514), tracking module 554 re-calibrates some or all of the system components.

Additionally, tracking module 554 tracks the movement of HMD 501 using slow calibration information from imaging device 560 and determines positions of a reference point on HMD 501 using observed locators from the slow calibration information and a model of HMD 501. Tracking module 554 also determines positions of the reference point on HMD 501 using position information from the fast calibration information from IMU 516 on HMD 501. Additionally, tracking module 554 may use portions of the fast calibration information, the slow calibration information, or some combination thereof, to predict a future location of HMD 501, which is provided to engine 556.

Engine 556 executes applications within the system and receives position information, acceleration information, velocity information, predicted future positions, or some combination thereof for HMD 501 from tracking module 554. Based on the received information, engine 556 determines content to provide to HMD 501 for presentation to the user, such as a virtual scene. For example, if the received information indicates that the user has looked to the left, engine 556 generates content for HMD 501 that mirrors or tracks the user's movement in a virtual environment. Additionally, engine 556 performs an action within an application executing on console 550 in response to an action request received from the I/O interface 570 and provides feedback to the user that the action was performed. The provided feedback may be visual or audible feedback via HMD 501 or haptic feedback via I/O interface 570.

Focus Adjustment Method

As discussed above, multi-planar varifocal system 500 may dynamically vary its focus to bring images presented to a user wearing HMD 501 into focus, which keeps the user's eyes in a zone of comfort as vergence and accommodation change.

Accordingly, a position, an orientation, and/or a movement of HMD 501 are determined by a combination of locators 514, IMU 516, head tracking sensors 518, imagining device 560, and tracking module 554, as described above in conjunction with FIG. 5. Portions of a virtual scene presented by HMD 501 are mapped to various positions and orientations of HMD 501. Thus, a portion of the virtual scene currently viewed by a user is determined based on the position, orientation, and movement of HMD 501. After determining the portion of the virtual scene being viewed by the user, the system may then determine a location or an object within the determined portion at which the user is looking to adjust focus for that location or object accordingly.

To determine the location or object within the determined portion of the virtual scene at which the user is looking, HMD 501 tracks the position and location of the user's eyes. Thus, HMD 501 determines an eye position for each eye of the user. For example, HMD 501 tracks at least a subset of the 3D position, roll, pitch, and yaw of each eye and uses these quantities to estimate a 3D gaze point of each eye. Further, information from past eye positions, information describing a position of the user's head, and information describing a scene presented to the user may also be used to estimate the 3D gaze point of an eye in various embodiments. For example, referring to FIG. 6, HMD 501 includes camera 612 for tracking the position of each eye 610. In this example, camera 102 captures images of the user's eyes and eye tracking module 510 determines an output for each eye 610 and gaze lines 614 corresponding to the gaze point or location where the user is looking based on the captured images.

Figure 6:
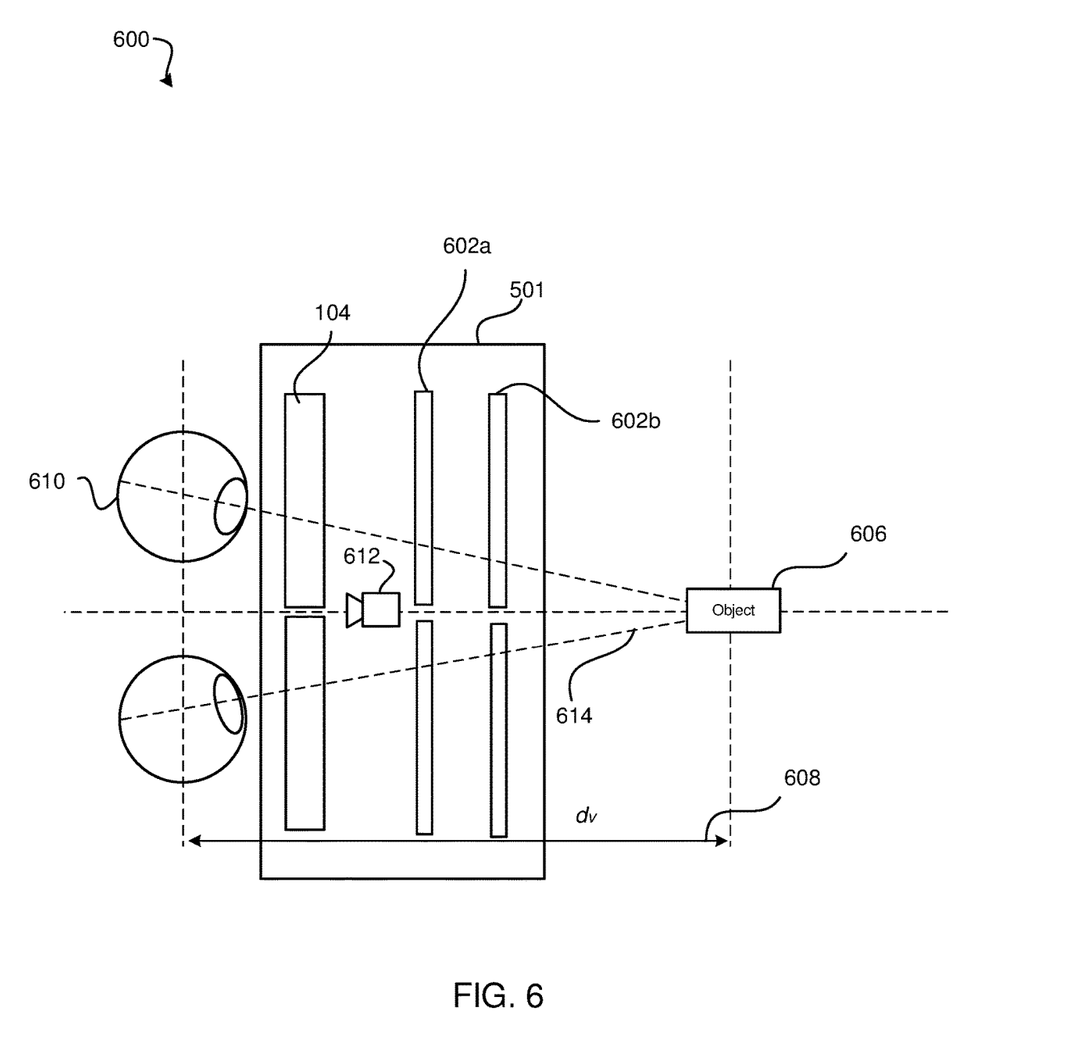
FIG. 6 shows a cross section of a multiplanar head mounted display that includes a camera for tracking eye position, in accordance with one embodiment.

FIG. 6, further show vergence depth ($d_v$) 608 of the gaze point for the user is determined based on an estimated intersection of gaze lines 614. As shown in FIG. 6, gaze lines 614 converge or intersect at $d_v$ 608, where object 606 is located. Because virtual distances within the virtual scene are known to the system, the vergence depth 608 can be filtered or verified to determine a more accurate vergence depth for the virtual scene. For example, vergence depth 608 is an approximation of the intersection of gaze lines 614, which are themselves an approximation based on the position of a user's eyes 610. Gaze lines 614 do not always appear to accurately intersect. Thus, virtual distances within the virtual scene can be compared to the vergence depth for the portion of the virtual scene to generate a vergence depth. Determining a more accurate vergence depth or gaze point enables the virtual scene to more accurately determine a user's object or plane of focus, allowing scene rendering module 520 to add depth of field blur to proper depths and/or objects in the virtual scene or otherwise modify to virtual scene to appear more realistic.

Accordingly, a state of optics block 104 is determined for a frame of the virtual scene based on states of optics block 104 during presentation of previous frames of the virtual scene. For example, focus prediction module 508 tracks the state of optics block 104 for various frames of the virtual scene to predict to future a state of optics block 104 for subsequent frames of the virtual scene. The predicted state of optics block 104 (e.g., a predicted location of optics block 104) allows the scene rendering module 514 to determine an adjustment to apply to a frame of the virtual scene so distortion caused by the predicted state of optics block 104 corrects or cancels the applied adjustment rather than distorting the frame. Thus, based on the state of optics block 104, a distortion correction is determined for application to a frame of the virtual scene to correct optical error introduced by the state of optics block 104.

Figure 7A:
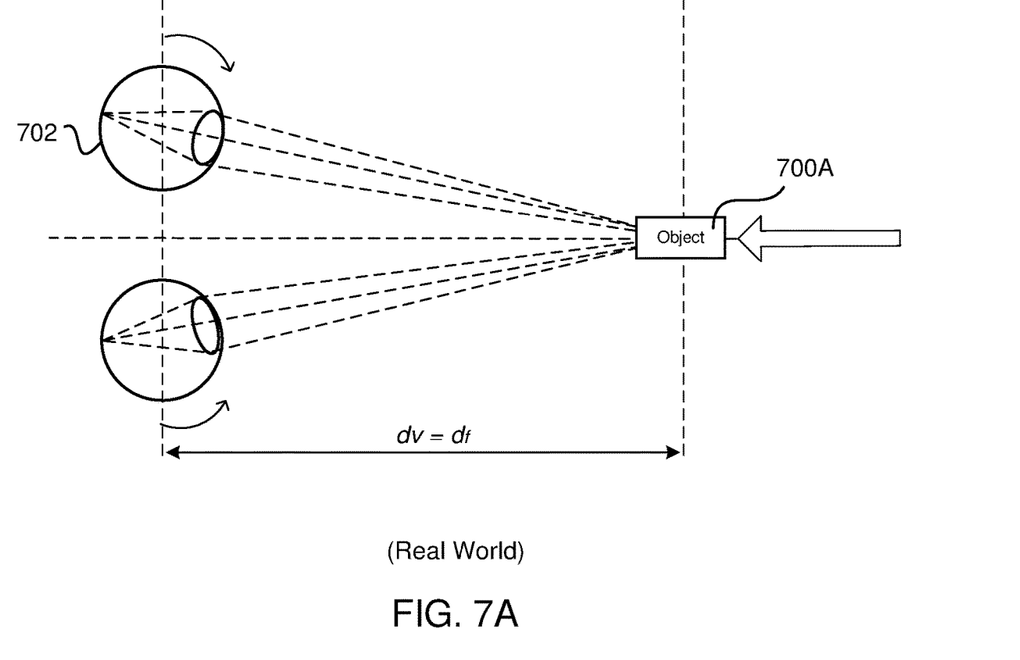
FIG. 7A shows the relationship between vergence and eye focal length in the real world.

FIG. 7A shows an example of how the human eye experiences vergence and accommodation in the real world. Vergence is the simultaneous movement or rotation of both eyes in opposite directions to obtain or maintain single binocular vision and is connected to accommodation of the eye. Under normal conditions, changing the focus of the eyes to look at an object at a different distance automatically causes vergence and accommodation. In the example of FIG. 7A, the user is looking at real object 700A (i.e., the user's eyes are verged on real object 700A and gaze lines from the user's eyes intersect at real object 700A.). As real object 700A is moved closer to the user, as indicated by the arrow in FIG. 7A, each eye 702 rotates inward to stay verged on real object 700A. As real object 700A gets closer, eye 702 must "accommodate" for the closer distance by reducing the power or focal length of eye 702 by changing its shape. Thus, under normal conditions in the real world, the vergence depth ($d_v$) equals the focal length ($d_f$).

Figure 7B:
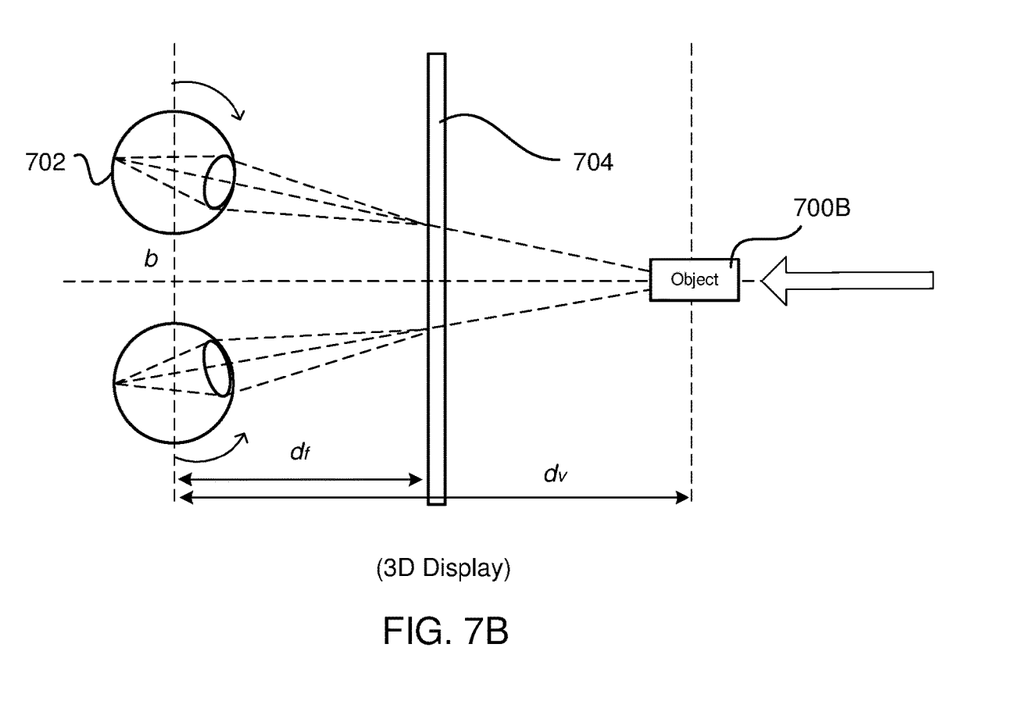
FIG. 7B shows the conflict between vergence and eye focal length in a three-dimensional display.

However, FIG. 7B shows an example conflict between vergence and accommodation that can occur with some three-dimensional displays. In this example, a user is looking at virtual object 700B displayed on 3D electronic screen 704; however, the user's eyes are verged on and gaze lines from the user's eyes intersect at virtual object 700B, which is a greater distance from the user's eyes than 3D electronic screen 704. As virtual object 700B is rendered on 3D electronic display 704 to appear closer to the user, each eye 702 again rotates inward to stay verged on virtual object 700B, but the power or focal length of each eye is not reduced; hence, the user's eyes do not accommodate as in FIG. 7A. Thus, instead of reducing power or focal length to accommodate for the closer vergence depth, eye 702 maintains accommodation at a distance associated with 3D electronic display 704. Thus, the vergence depth ($d_v$) often does not equal the focal length ($d_f$) for the human eye for objects displayed on 3D electronic displays. This discrepancy between vergence depth and focal length is referred to as "vergence-accommodation conflict." A user experiencing only vergence or accommodation and not both will eventually experience some degree of fatigue and nausea, which is undesirable desirable for virtual reality system creators. Changes in vergence for a 3D electronic screen may be accommodated by a headset dynamically adjusting the power of an optics block based on the vergence depth (or predicted vergence depth).

Figure 8A:
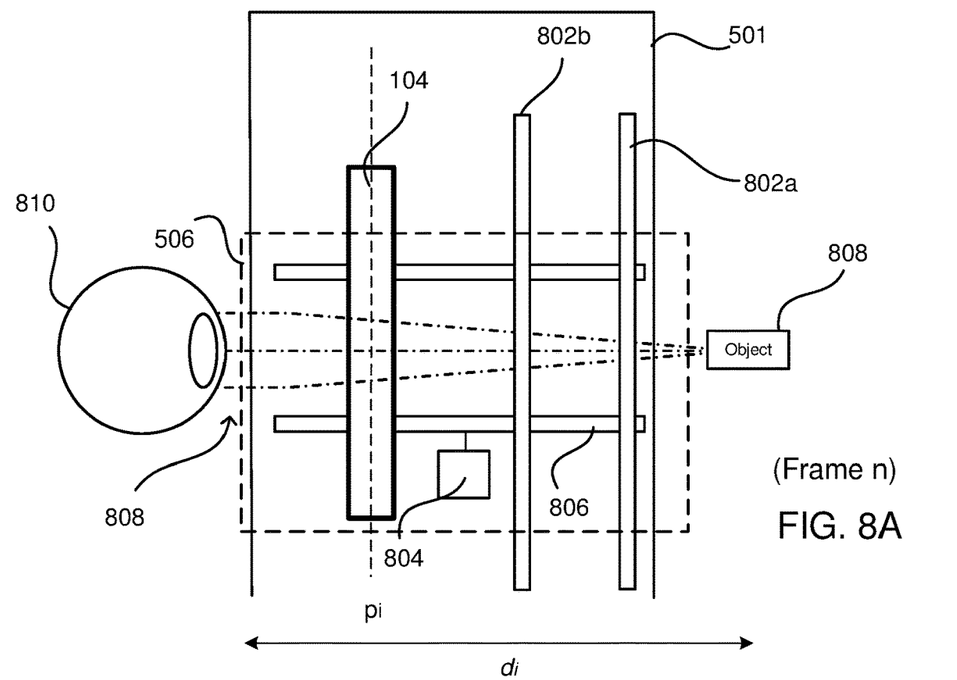
FIG. 8A shows an optics block of a multiplanar head mounted display in a first position relative to the electronic displays, in accordance with one embodiment.
Figure 8B:
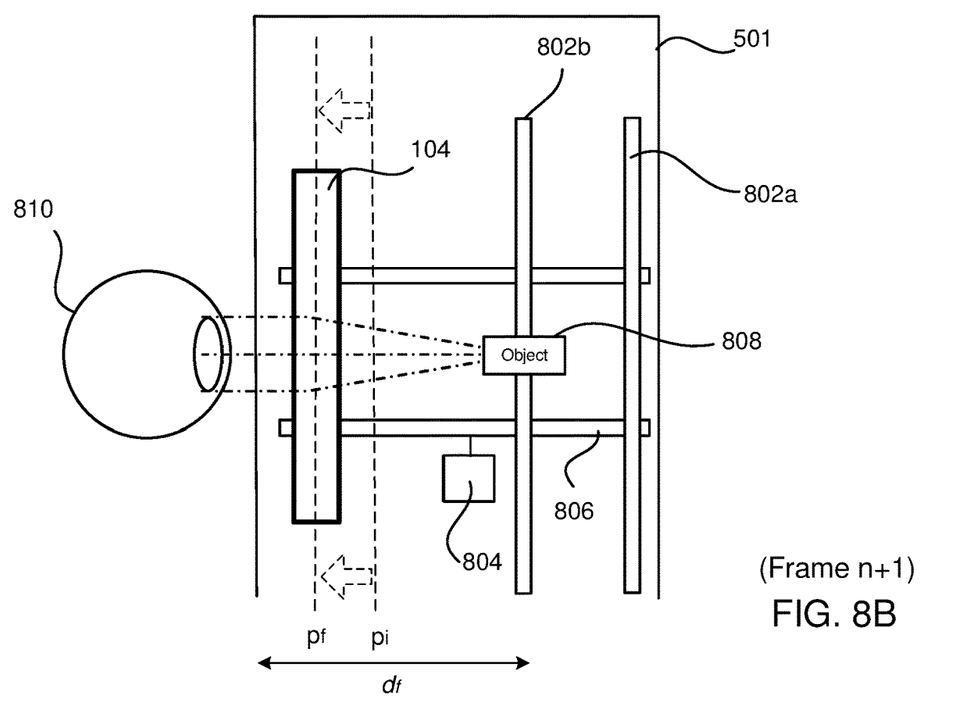
FIG. 8B shows the optics block in a second position relative to FIG. 8A that has been moved using a varifocal element, in accordance with one embodiment.

Accordingly, the focal length (or power) of optics block 104 is adjusted for the presented frame of the virtual scene to provide accommodation for the generated vergence depth. FIGS. 8A and 8B show an example process for adjusting the focal length of optics block 104 by varying the distance between electronic display(s) 802 and optics block 104 using varifocal element 804. In the example of FIGS. 8A and 8B, varifocal actuation block 506 includes varifocal element 804, such as an actuator or motor and track 806, but may also include other components enabling optics block 104, electronic display(s) 802 (e.g., 802a, 802b), or both to move along track 806 to dynamically adjust the optical power of optics block 104.

FIG. 8A shows an example of HMD 501 providing focus adjustment for frame n of a virtual scene. In this example, virtual scene includes object 808 displayed on electronic display 802a at which the gaze of user 800 is directed (i.e., verged). A virtual image of object 808 is located a virtual distance $d_i$, behind electronic display 802a, from exit pupil 810. In the example of FIG. 8A, optics block 104 is in position $p_i$, which provides accommodation for distance $d_i$ to enable comfortable viewing of object 806.

FIG. 8B shows HMD 501 providing focus adjustment for a subsequent frame n+1 of the virtual scene. In this example, user 800 may have repositioned its eyes as object 808 quickly moved toward user 800 in the virtual scene. As a result, the virtual image of object 808 is located relatively close to or on electronic display 802b. In response to the location of object 808 closer, eyes of user 800 rotate inward to verge on object 808, causing vergence processing module 512 to determine a new vergence depth for frame n+1 and to provide the new vergence depth to varifocal actuation block 506. Based on the new vergence depth, varifocal element 804 moves optics block 104 from position $p_i$ to new position $p_f$ to accommodate user 800 at the new vergence depth $d_f$ for the closer object 808.

In one example, each state of optics block 104 corresponds to a combination of focal length and eye position, provides accommodation for a range of vergence depths, and is associated with a specific position of optics block 104. Accordingly, vergence depths may be mapped to positions of optics block 104 and stored in a lookup table. Thus, when a vergence depth is received from vergence processing module 512, varifocal actuation block 506 automatically moves optics block 104 to a position corresponding to the received vergence depth based on the lookup table.

In many instances, virtual reality systems aim to present users with a virtual environment that closely simulates a real world environment or provides users with content causing the users to get lost in the illusion created by the virtual reality systems. To provide users with a realistic or captivating virtual environment, a virtual reality system implements multiple systems and methods discussed herein to operate together at efficiencies that are imperceptible to a user. For example, transition delays are particularly costly to user experience with virtual reality systems. If a user is waiting for the virtual scene presented by a headset to catch up to what the user's brain is already expecting, the illusion is broken and/or the user may get nauseous. However, processing speeds and commercially available actuators are currently faster than the coordination of the human eye to change the shape of its lens and the human brain to register what the new shape of the lens is focused on, allowing the disclosed systems and methods to provide users with high-quality virtual environments.

Referring back to FIGS. 8A and 8B to provide accommodation for a new vergence depth while also leaving time to perform additional calculations without users perceiving a delay, a speed at which varifocal element 804 moves optics block 104 is limited by a rate at which the human eye performs accommodation. For example, assuming human eye accommodation has a 10 diopter/sec peak velocity, a 100 diopter/sec$^2$ peak acceleration, and changing the distance between electronic display(s) 802 and optics block 104 moves a virtual image about 0.5 diopters/mm, varifocal element 804 operates with a minimum velocity of 10/0.5=20 mm/sec and a minimum acceleration of 100/0.5=200 mm/sec$^2$ acceleration to prevent a user from perceiving the repositioning of optics block 104 relative to electronic display(s) 102. There are commercially available actuators satisfying the preceding values.

Further, depth of field blur can be determined for the scene based on the user's viewing location. To determine depth of field blur, a point within the scene presented to the user by the HMD 501 where the user's gaze is directed is determined, and optics block 104 is configured to a state in which the point within the scene where the user's gaze is directed is brought into focus for the user. Depth of field blur is then determined relative to the point within the scene where the user's gaze is directed. In one example, the depth within the scene geometry (e.g., distances within the virtual scene) corresponding to the vergence depth is determined as the plane of focus for the frame of the virtual scene. Accordingly, objects or features of the virtual environment with distances within the virtual scene greater or less than a distance of the plane of focus from the user's eyes may be rendered with synthetic blur. In another example, the depth of field blur is determined based on an object in the scene on which the user's gaze is focused at the depth corresponding to the vergence depth (i.e., a "focal object"). Thus, the focal object, rather than the plane of focus, provides a reference point to identify other objects in the scene that are rendered with depth of field blur, even if the other objects have a similar depth in the scene as the focal object.

The blur may be progressive, with as a level of blur applied to objects or features based on a distance of the objects or features from the plane of focus (or object of focus), or a generally uniform level of blur may be applied to objects or features in the virtual scene. Depth of field blur is a natural consequence of binocular vision, so including depth of field blur in the virtual scene furthers to the illusion of the virtual scene by providing the user with an expected depth cue, which may enhance the user experience with the virtual scene. Further, the blur may be based at least in part on measured properties of the user's eye. For example, wavefront aberrations of the user's eye could be measured by a wavefront aberrometer, with depth of field blur based at least in part on the measured wavefront aberrations. Example wavefront aberrations of the user's eye may include higher-order aberrations not typically corrected by eye glasses, contact lenses, or refractive surgery. Accounting for properties of the user's eye when determining the depth of field blur may improve user comfort when viewing the scene.

The frame of the virtual scene corresponding to the portion of the virtual scene being viewed by the user is displayed on electronic display(s) 102 with a distortion correction to correct optical error caused by the determined state of optics block 104 and with depth of field blur based on the vergence depth. Further, varifocal actuation block 506 has changed the focus of optics block 104 to provide focus and accommodation to the location in the portion of the virtual scene where the user's eyes are verged.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A head mounted display (HMD) comprising:
   at least one processor;
   a first electronic display configured to display a first set of depth values within a virtual scene to a user wearing the HMD, the first electronic display being mapped to a first set of scene geometry based on depth information provided by a content creator;
   a second electronic display configured to display a second set of depth values of the virtual scene to the user wearing the HIVID, the first set of depth values being different relative to the second set of depth values and the second electronic display being mapped to a different second set of scene geometry based on depth information provided by the content creator;
   an optics block configured to direct light from the first electronic display and the second electronic display to an exit pupil of the HIVID;
   an eye tracking system including an image capturing element, the eye tracking system configured to determine an eye position of each eye of the user and gaze lines for each eye of the user;
   memory including instructions that, when executed by the at least one processor, cause the at least one processor to:
      determine a vergence depth for the user based on an estimated intersection of the gaze lines for each eye of the user; and
   a varifocal actuation block configured to change a focal length of the optics block based at least in part on the vergence depth.

2. The HMD of claim 1, further comprising:
   one or more optical combining elements, wherein the first electronic display is positioned perpendicular to the second electronic display and the one or more optical combining elements combine the first set of depth values of the virtual scene with the second set of depth values of the virtual scene for viewing by the user wearing the HMD.

3. The HMD of claim 1, wherein at least one of the first electronic display and the second electronic display are at least semi-transparent to allow image light of the virtual scene to be combined for viewing by the user wearing the HMD.

4. The HMD of claim 1, wherein the varifocal actuation block is configured to change the focal length of the optics block by changing a distance between the optics block and the first electronic display and the second electronic display.

5. The HMD of claim 1, wherein the varifocal actuation block is configured to change the focal length of the optics block by changing a shape or optical path length of a lens included in the optics block.

6. The HMD of claim 5, wherein changing the shape or optical path length of the lens of the optics block includes using at least one selected from a group consisting of: a shape-changing polymer lens, a liquid lens and electrowetting, an Alvarez-Lohmann lens, a deformable membrane mirror, a liquid crystal (electroactive) lens, a phase-only spatial light modulator (SLM), and any combination thereof.

7. A headset comprising:
   at least one processor;
   a first electronic display configured to display a first set of depth values within a virtual scene to a user wearing the headset, the first electronic display being mapped to a first set of scene geometry based on depth information provided by a content creator;
   a second electronic display configured to display a second set of depth values of the virtual scene to the user wearing the headset, the first set of depth values being different relative to the second set of depth values and the second electronic display being mapped to a different second set of scene geometry based on depth information provided by the content creator;
   an optics block configured to direct light from the first electronic display and the second electronic display to an exit pupil of the headset;
   an eye tracking system including an image capturing element, the eye tracking system configured to determine an eye position of each eye of the user, gaze lines for each eye of the user based on the eye position, and a vergence depth corresponding to a viewing location of the user within the virtual scene; and
   a varifocal actuation block configured to change a focal length of the optics block based at least in part on the vergence depth.

8. The headset of claim 7, wherein the first electronic display is positioned perpendicular to the second electronic display and one or more optical combining elements combine the first set of depth values of the virtual scene with the second set of depth values of the virtual scene for viewing by the user wearing the headset.

9. The headset of claim 7, wherein at least one of the first electronic display and the second electronic display are at least semi-transparent to allow image light of the virtual scene to be combined for viewing by the user wearing the headset.

10. The headset of claim 7, wherein the varifocal actuation block is configured to change the focal length of the optics block by changing a distance between the optics block and the first electronic display and the second electronic display.

11. The headset of claim 7, wherein the varifocal actuation block is configured to change the focal length of the optics block by changing a shape or optical path length of a lens included in the optics block.

12. The headset of claim 11, wherein changing the shape or optical path length of the lens of the optics block includes using at least one selected from a group consisting of: a shape-changing polymer lens, a liquid lens and electrowetting, an Alvarez-Lohmann lens, a deformable membrane mirror, a liquid crystal (electroactive) lens, a phase-only spatial light modulator (SLM), and any combination thereof.

* * * * *